May 2, 1944.  H. M. VIETHS  2,348,040
FISH CATCHING DEVICE
Filed Dec. 8, 1941
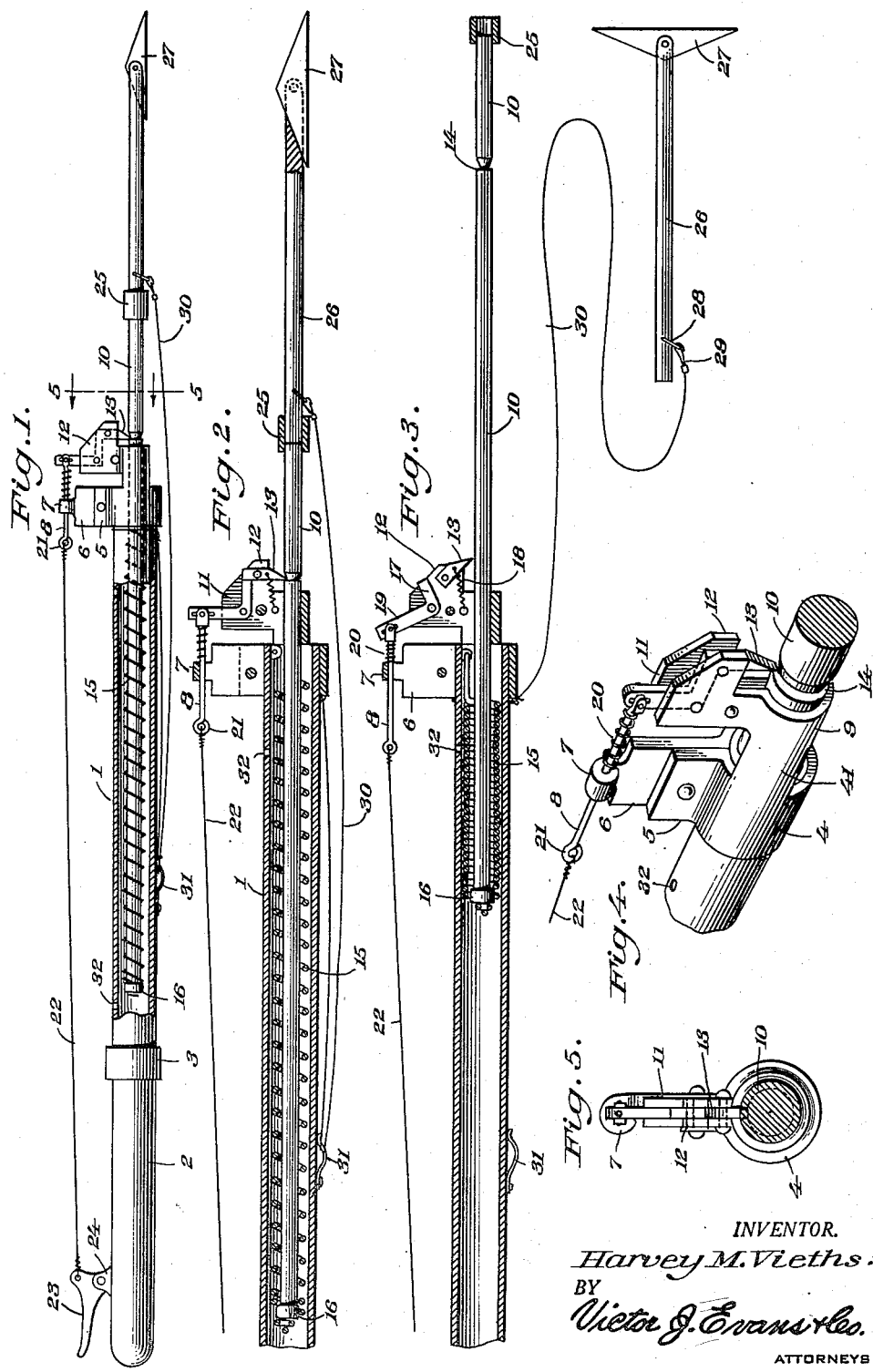
INVENTOR.
Harvey M. Vieths:
BY
Victor J. Evans & Co.
ATTORNEYS

Patented May 2, 1944

2,348,040

UNITED STATES PATENT OFFICE 2,348,040

FISH CATCHING DEVICE

Harvey M. Vieths, Mesa, Idaho

Application December 8, 1941, Serial No. 422,141

2 Claims. (Cl. 124—27)

This invention relates to fish catching devices of the harpoon type, and its general object is to provide a device that can be operated with minimum effort and requires no special skill to use the same with efficacious results, in that the device includes a spring pressed plunger having a barbed spear detachably associated therewith, the plunger being held in set position against the action of its spring by a trigger which is released from the plunger by conveniently located handled means, so that when the spear is aimed at a fish and the trigger released, the spear is projected into the fish and the barb prevents the fish from escaping.

A further object is to provide a fishing device that includes a barbed spear which is connected to the device by a flexible element, thus allowing a caught fish to struggle without damaging the device.

Another object is to provide a fishing device that is simple in construction, inexpensive to manufacture, and efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a side view of my device in set position, and with the cylinder broken away and in section.

Figure 2 is an enlarged fragmentary longitudinal sectional view, with the device in set position.

Figure 3 is a similar view, with the device in released position.

Figure 4 is a fragmentary detail perspective view on an enlarged scale to illustrate the brackets for the trigger and the trigger latching means.

Figure 5 is a sectional view taken approximately on line 5—5 of Figure 1, looking in the direction of the arrows.

Referring to the drawing in detail, it will be noted that the cylinder 1 is of elongated formation and has a threaded rear end to which is detachably secured a handle 2 through the medium of a coupling 3 threaded on the cylinder. Secured to the front end portion of the cylinder is a bracket that includes a clamping collar 4 formed with flat upright ears 5 and 6 respectively, the ears being riveted together for locking the collar in clamped engagement about the cylinder. The ear 6 is of greater height than that of the ear 5 and has a reduced upper end rolled upon itself to provide a guide bearing 7 for a latch rod 8 that is slidably mounted in the bearing for a purpose which will be later apparent.

Formed on or otherwise secured to the clamping collar 4 by side members 4' forwardly extending from the collar 4, is a guide collar 9 for the plunger 10 and formed on and rising from the collar 9 is a pair of spaced parallel flat arms 11 that are held together by a pin and have forwardly directed lugs 12 formed thereon.

Pivotally mounted between the lugs 12 is a trigger 13 having a beveled lower end engageable with the rear shoulder of an annular groove 14 in the plunger 10 for holding the latter against the action of a coil spring 15 that is sleeved on the plunger. The plunger is mounted in the cylinder 1 and is of a length to extend a considerable distance forwardly therefrom, and the spring is housed in the cylinder, with its forward end anchored to the front end of the cylinder, while the rear end of the spring is reduced and bears against a cap 16 fixed to the rear end of the plunger, as best shown in Figure 3.

The trigger is provided with a right angle latch member that is pivoted between the arms 11 and the forwardly directed portion 17 of the latch member is engageable with the rear face of the trigger above the pivot thereof for holding the latter in the groove 14, as best shown in Figure 4. It will be noted that the wall of the groove is tapered outwardly from the trigger receiving shoulder thereof, to the outer surface of the plunger, so that when the plunger is moved inwardly against the action of the spring 15, the trigger which is normally urged rearwardly on its pivot by a spring 18, will automatically seat itself within the groove and against the shoulder.

The upright portion 19 of the latch member is slotted longitudinally for a portion of its length and the front end portion of the latch rod 8 is bifurcated and is pivoted to the upright portion 19 by a pin extending through the slot for holding the portion 19 between the bifurcations. Sleeved on the rod 8 is a coil spring 20 that has its ends bearing against the guide member 7 and the bifurcated end of the rod, as best shown in Figure 4, the spring 20 acting to hold the latch member against the trigger, with the latter in the groove 14. The rear end of the rod 8 is formed with an eye 21 having one end of a strand 22 of wire connected thereto, while the opposite end of the strand is connected to a hand lever 23 that is pivoted between a pair of spaced parallel ears 24 secured to and rising from the handle 2, adjacent the rear end thereof, as clearly shown in Figure 1.

Fixed to the forward end of the plunger is a socket member 25 that has loosely fitted therein for ready removal therefrom the rear end portion of a shaft 26 of a spear that includes an elongated triangular shaped blade-like barb 27, the latter being pivoted centrally thereof to and between the bifurcated free end portion of the shaft, and the bifurcations are provided by slotting the shaft longitudinally from its forward end. The rear end of the slot is inclined, to allow the barb to be positioned in alignment with the shaft, with a penetrating point of the barb directed forwardly, as shown in Figure 2, but the barb is movable on its pivot to a crosswise position of Figure 3.

The shaft has a ring 28 secured thereto adjacent its rear end for receiving a snap hook 29, the latter having one end of a flexible element or strand 30 of wire, cord or the like connected thereto, and the opposite end of the strand is connected to the cylinder. A spring clip 31 is secured to the cylinder adjacent to the rear end thereof, for holding the strand 30 when the device is in its set position of Figure 1.

From the above description and disclosure in the drawing, it is believed that the operation of my device will be obvious, but it might be mentioned that the device is disposed in set position by pushing the plunger inwardly within the cylinder until the trigger seats itself into the groove 14. The shaft of the spear is then mounted in the socket member 25 and the barb is disposed to the position of Figure 2. When a fish is sighted, the spear is aimed toward the same and the hand lever 23 is pressed for moving the latch member on its pivot and out of engagement with the trigger, thus releasing the plunger to project the spear into the fish. The fish in attempting to escape causes the barb to move crosswise of the shaft, as shown in Figure 3, thus rendering escape impossible. It will of course be understood that the spear leaves the socket member 25 when the fish is caught, and thus allows the fish to struggle without subjecting the plunger to strain which may result in damage thereto. The fish is released from the spear by first removing the strand 30 from the ring 28, and thence the spear is worked free from the fish.

The cylinder 1 is provided with vent openings 32 adjacent the ends thereof, in order to allow free movement of the plunger as will be apparent.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. In a device of the character described, an elongated cylinder, a spring pressed plunger mounted in the cylinder and projecting forwardly thereof, said plunger being provided with an annular groove in its forward portion, a bracket embracing the front end of the cylinder and having a collar projecting forwardly thereof to slidably support the plunger, an upstanding support on the inner portion of the bracket having a guide bearing thereon, a pair of transversely spaced arms rising from the collar having forwardly projecting lugs, a trigger element pivotally mounted between the lugs adapted to assume a position radially of the plunger with one end engaging the groove to releasably hold the plunger in retracted position, a pivoted lever mounted on said arms disposed to abut the outer portion of the trigger, an operating mechanism controlled from the rear portion of the cylinder for actuating said lever to disengage the trigger and release the plunger.

2. In a device of the character described, an elongated cylinder, a spring pressed plunger mounted in the cylinder and projecting forwardly thereof, said plunger being provided with an annular groove in its forward portion, a bracket embracing the front end of the cylinder and having a collar projecting forwardly thereof to slidably support the plunger, an upstanding support on the inner portion of the bracket having a guide bearing thereon, a pair of transversely spaced arms rising from the collar having forwardly projecting lugs, a trigger element pivotally mounted between the lugs adapted to assume a position radially of the plunger with one end engaging the groove to releasably hold the plunger in retracted position, an L-shaped lever pivotally mounted between the arms having one end disposed to abut the inner side of the trigger at the end away from the plunger, the opposite longer arm of said lever extending away from the barrel, a rod slidable through the guide bearing and having its forward end pivotally connected to said lever arm, a compression spring sleeved about the rod between the bearing and the lever to resiliently hold the latter in trigger engaging position, a hand lever pivotally mounted on the rear part of the cylinder, and an element connecting the hand lever with the slide rod for selectively swinging the L-shaped lever to disengage the trigger and release the plunger.

HARVEY M. VIETHS.